Patented Mar. 22, 1927.

1,621,543

UNITED STATES PATENT OFFICE.

MATTHEW S. HOPKINS, OF READING, AND NORMAN UNDERWOOD, OF SWARTHMORE, PENNSYLVANIA, ASSIGNORS TO CHARLES ENEU JOHNSON AND COMPANY, OF PHILADELPHIA, PENNSYLVANIA, A CORPORATION OF PENNSYLVANIA.

PRINTING INK.

No Drawing. Application filed June 19, 1924. Serial No. 720,937.

It is our observation that casein may be precipitated from its solution and caused to alter its physical properties in a manner which for lack of a better term may be called resinification. This characteristic property is particularly evident when a casein solution is exposed to the influence of an agent reacting as an acid, for example, formaldehyde. An application of this principle has been made in the preparation and use of casein as base or vehicle for printing inks, particularly the type known as rotogravure, intaglio or embossing inks. An ink prepared in this way is well adapted for working on the press. It is especially fitted for rapid drying, with firm adherence to the paper surface and substantially proof against mechanical damage or water. In fact during the treatment of the printed sheet, the casein ink is rendered insoluble or water-proof.

In carrying out our invention, one method is to prepare a casein solution in water by the aid of borax, ammonia and sodium fluoride. While the proportions will be subject to minor variation we find it preferable to use 375 parts by weight of casein, 41 parts of borax, 45 parts of ammonia and 25 parts of sodium fluoride in 2040 parts of water. Under the conditions given the casein is readily dissolved and maintained in a stable condition well adapted for storage.

This casein solution is then appropriately colored as desired with either solid pigments or soluble coloring matters. In making black ink we have found one pound of lamp black will be sufficient for fifteen pounds of casein solution. The color is worked into the casein solution by milling, grinding or the like operation to produce a uniform, fluent mass.

To the above mixture there is added one pound of glycerine, which is blended and intimately mixed with the compound. We then add seven ounces of water and three and one-half ounces of formaldehyde, and distribute them uniformly throughout the product.

It is found that this product serves as an efficient ink in rapid rotogravure, intaglio or embossing printing. It does not dry in the fountains, is easily picked up by the rollers but the excess is as readily removed. The impressions on the paper are clear-cut and of deep tone.

The ink adheres strongly to the paper. Rapid drying is characteristic of this ink. During the drying process, the casein is precipitated from the solution and in the presence of the formaldehyde is "fixed" i. e., rendered substantially waterproof and proof against disintegration. This phenomenon is apparently an incident of the effect of the formaldehyde operating on the ink solution during the process of evaporation and resulting from the change in concentration. While the exact chemical reactions are not certain, it is believed that there is a condensation product formed of the casein with one or more of the agents present. It is at least apparent that the ink is made somewhat resinous by this method and on heating, bonds the pigment to the paper.

It is not necessary to add the formaldehyde or equivalent reagent to the ink before printing as the desired result may be obtained by exposing the casein ink to the vapors of the volatile reagent during the printing operation or immediately afterwards but before the ink is dry. It is found that the moist casein ink will be rendered insoluble in water by exposure to the formaldehyde vapors. This will result in the transformation in the physical properties of the ink in the manner desired. The precipitant effect is also observed when we use acid substances in place of the formaldehyde. Thus hydrochloric acid as an ingredient in the ink or treatment of the freshly printed surface by the vapor of hydrochloric acid will give the desired results.

Such minor variations or modifications of the above procedure as may suggest themselves to the skilled worker in this art, are of course contemplated as within the scope of the appended claim.

What we claim is:

An ink composed of a pigment, glycerine, formaldehyde and an alkaline solution containing casein.

In testimony whereof we have hereunto affixed our signatures.

MATTHEW S. HOPKINS.
NORMAN UNDERWOOD.